United States Patent
Uno

(10) Patent No.: US 6,646,400 B2
(45) Date of Patent: Nov. 11, 2003

(54) POWER CONTROL CIRCUIT FOR A BICYCLE ELECTROMOTIVE UNIT

(75) Inventor: Kouji Uno, Osaka (JP)

(73) Assignee: Shimano, Inc., Osaka (JP)

( * ) Notice: Subject to any disclaimer, the term of this patent is extended or adjusted under 35 U.S.C. 154(b) by 137 days.

(21) Appl. No.: 10/017,088

(22) Filed: Dec. 13, 2001

(65) Prior Publication Data

US 2002/0079851 A1 Jun. 27, 2002

(30) Foreign Application Priority Data

Dec. 22, 2000 (JP) ........................................ 2000-391095

(51) Int. Cl.[7] ................................................. B62J 6/00
(52) U.S. Cl. ............................. 318/479; 318/2; 315/78; 320/123; 322/1
(58) Field of Search ................................. 318/1, 2, 141, 318/459, 478, 479; 388/930; 315/76, 77, 78, 82, 83; 320/1, 5, 9, 10, 13, 116, 117, 121, 123; 322/1

(56) References Cited

U.S. PATENT DOCUMENTS

| | | | |
|---|---|---|---|
| 3,792,307 A | * | 2/1974 | Baker |
| 3,904,920 A | * | 9/1975 | Griffith |
| 4,950,971 A | * | 8/1990 | Hegi et al. |
| 5,663,628 A | * | 9/1997 | Fujii ............................. 320/1 |
| 5,881,082 A | * | 3/1999 | Yabuuchi ..................... 372/38 |
| 6,157,165 A | * | 12/2000 | Kinoshita et al. ........... 320/116 |
| 6,418,041 B1 | * | 7/2002 | Kitamura .................... 363/125 |

FOREIGN PATENT DOCUMENTS

| | | |
|---|---|---|
| JP | 5-238447 | 9/1993 |
| JP | 2000-62523 | 2/2000 |

* cited by examiner

Primary Examiner—Bentsu Ro
(74) Attorney, Agent, or Firm—James A. Deland

(57) ABSTRACT

A power control circuit having an input for receiving power from a power source and an output for driving a bicycle electromotive unit comprises a storage unit; a first switching element disposed between the storage unit and the output; a voltage sensor that senses a voltage associated with the storage unit; and a switch control circuit operatively coupled to the voltage sensor and to the first switching element to disable the communication of power to the output when the voltage associated with the storage unit is less than a first reference voltage and to enable the communication of power to the output when the voltage associated with the storage unit is greater than the first reference voltage. After the switch control circuit enables the communication of power to the output, the switch control circuit may maintain the communication of power to the output when the voltage associated with the storage unit falls below the first reference voltage and is above a second reference voltage. A second switching element may be disposed between the input and the storage unit, wherein the switch control circuit is operatively coupled to the second switching element to enable the communication of power to the storage unit when the voltage associated with the storage unit is less than the first reference voltage and to disable the communication of power to the storage unit when the voltage associated with the storage unit is greater than a third reference voltage.

24 Claims, 2 Drawing Sheets

POWER CONTROL CIRCUIT FOR A BICYCLE ELECTROMOTIVE UNIT

BACKGROUND OF THE INVENTION

The present invention is directed to bicycles and, more particularly, to a power control circuit for an electromotive unit used with the bicycle.

Bicycles may be equipped with dynamos for energizing headlights and other devices. Such conventional devices are disclosed in JP (Kokai) 5-238447 and 2000-62523. In the first disclosed device, physical exertion on the rider is reduced and headlight luminance is enhanced by sensing the terminal voltage of the battery and controlling the field current of the dynamo in accordance with the sensed voltage. In the second disclosed device, a charging capacitor is provided and electric power is fed from the charging capacitor to the headlight when the dynamo generates too little electric power.

The dynamo-powered equipment of current bicycles includes not only headlights but also actuators for shifting electrically powered shifters, actuators for adjusting the damping force of an electrically powered suspension, indicator backlights for cycle computers, and the like. Such equipment will be referred to herein as "electromotive units." Electromotive units begin operating unstably when the drive voltage drops below a specific level. In the particular example of a motor being used as an actuator, a reduction in the drive voltage reduces the rotational speed of the motor and makes the motor incapable of operating at normal speed. Thus, the reduced drive voltage may cause an electrically powered shifter to stop during shifting, may render the actuator of an electrically powered suspension incapable of moving in the middle of operation, and may cause other problems. A reduced voltage may cause a microcomputer used for an electromotive unit to malfunction, and a reduced voltage may cause insufficient backlighting for a display screen of a cycle computer. With such conventional devices, it was impossible to address the aforementioned problems because actuators or the like were not considered to be loads (driven equipment).

SUMMARY OF THE INVENTION

The present invention is directed to a power control circuit for a bicycle electromotive unit that helps to avoid malfunction of the electromotive unit and/or helps to avoid overcharging of a power storage device. In one embodiment of the present invention, not to be limited thereto, a power control circuit having an input for receiving power from a power source and an output for driving a bicycle electromotive unit comprises a storage unit; a first switching element disposed between the storage unit and the output; a voltage sensor that senses a voltage associated with the storage unit; and a switch control circuit operatively coupled to the voltage sensor and to the first switching element to disable the communication of power to the output when the voltage associated with the storage unit is less than a first reference voltage and to enable the communication of power to the output when the voltage associated with the storage unit is greater than the first reference voltage. If desired, after the switch control circuit enables the communication of power to the output, the switch control circuit may maintain the communication of power to the output when the voltage associated with the storage unit falls below the first reference voltage and is above a second reference voltage. Such a structure may provide a hysteresis effect to stabilize the switching operation if the switch control circuit enables the first switching element when the voltage associated with the storage unit falls below the second reference voltage.

In another aspect of the present invention, not to be limited thereto, a second switching element is disposed between the input and the storage unit, wherein the switch control circuit is operatively coupled to the second switching element to enable the communication of power to the storage unit when the voltage associated with the storage unit is less than the first reference voltage and to disable the communication of power to the storage unit when the voltage associated with the storage unit is greater than a third reference voltage. This helps to avoid the storage unit from being overcharged or otherwise contribute to the malfunction of the electromotive unit from excessive voltage.

DETAILED DESCRIPTION OF THE EMBODIMENTS

Figure 1:
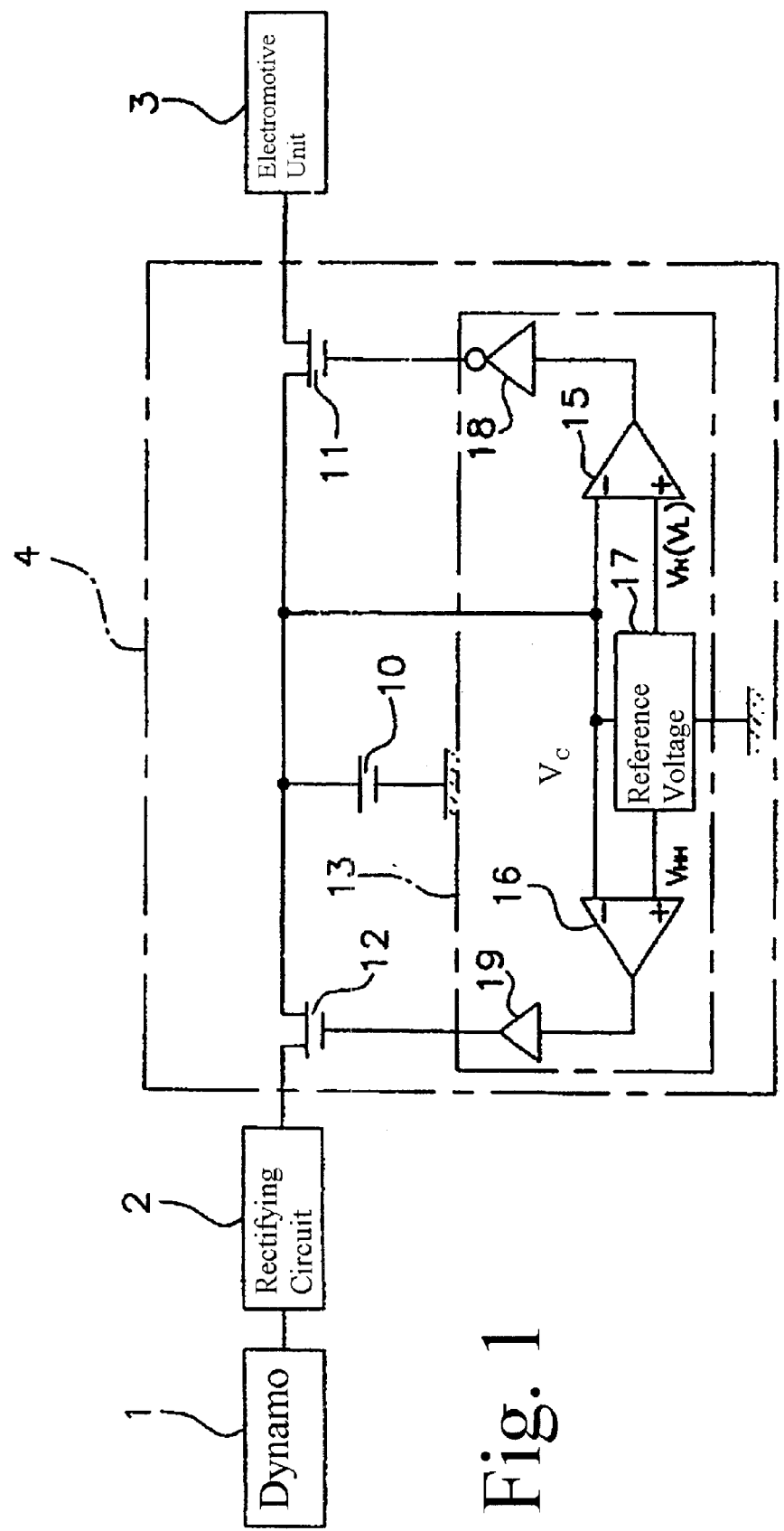
FIG. 1 is a schematic diagram of a particular embodiment of a power control circuit according to the present invention.

FIG. 1 is a schematic diagram of a particular embodiment of a bicycle device according to the present invention. The device comprises a dynamo (generator) 1, a rectifying circuit 2, an electromotive unit 3, and a power control circuit 4 disposed between the rectifying circuit 2 and the electromotive unit 3. The dynamo 1 may be, for example, a hub dynamo mounted inside the front-wheel hub of a bicycle. The rectifying circuit 2 is designed to rectify the AC voltage output of the dynamo 1 and may comprise diode bridge circuits, smoothing capacitors, and the like. The electromotive unit 3 may be an actuator for a headlight, an electrically powered shifter, an electrically powered suspension, a cycle computer, and so on, and it is controllably driven by the power control circuit 4.

The power control circuit 4 comprises a storage unit on the form of a charging capacitor 10, a first switching element 11 disposed between the charging capacitor 10 and the output to electromotive unit 3, a second switching element 12 disposed at the input between the rectifying circuit 2 and the charging capacitor 10, and a control circuit 13 (voltage sensor) whose function is to sense the charging voltage. Using a capacitor for the storage unit provides for higher durability than a battery, and the device can last for ten years or more, which ordinarily exceeds the normal service life of the electromotive unit 3. In this embodiment, first switching element 11 and second switching element 12 each comprise a field-effect transistor that is closed (enabled) when the voltage applied to the gate terminal is high (H) and opened (disabled) when the voltage is low (L). The use of transistors for the switching elements allows the circuit to be made smaller and more lightweight, provides for a longer circuit life, and allows high speed switching. The control circuit 13 comprises first and second comparators 15 and 16, a reference voltage generating circuit 17 for applying reference voltages to the comparators 15 and 16, an inverter 18 connected in series with the output terminal of the first comparator 15, and a buffer 19 connected in series with the output terminal of the second comparator 16.

A charging voltage $V_C$ is applied to the minus terminals of the first and second comparators 15 and 16, and the reference voltages from the reference voltage generating circuit 17 are applied to the plus terminals of the first and second comparators 15 and 16. The reference voltage generating circuit 17 initially applies a first reference voltage $V_H$ to the first comparator 15, and then applies a second reference voltage $V_L$ below the first reference voltage $V_H$ once the charging voltage $V_C$ exceeds the first reference voltage $V_H$. The reference voltage generating circuit 17 also applies a third reference voltage $V_{HH}$, which is even higher than the first reference voltage $V_H$, to the second comparator 16.

Figure 2:
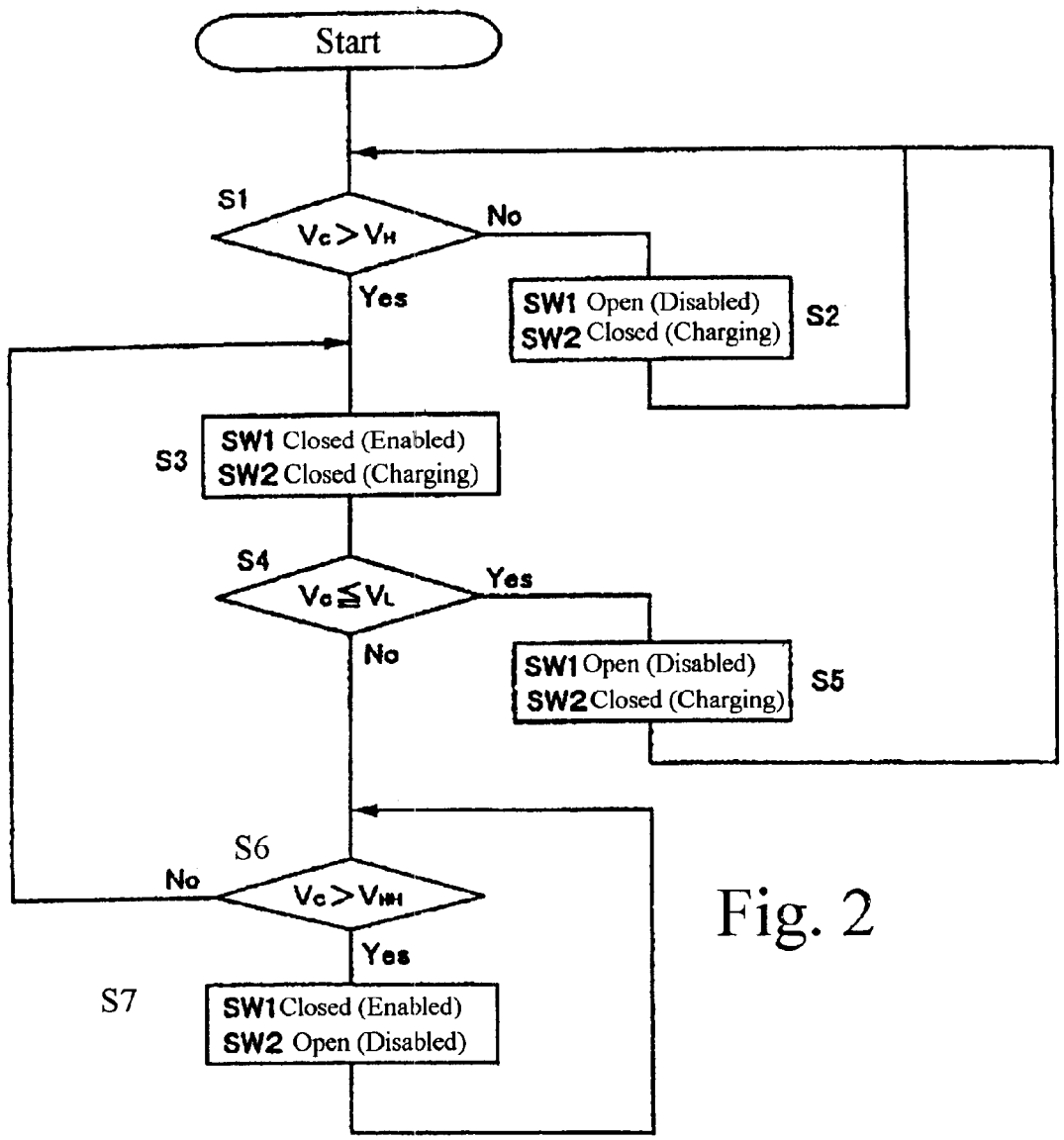
FIG. 2 is a flow chart illustrating the operation of the circuit shown in FIG. 1.

The operation of the circuit thus configured will now be described with reference to the flowchart shown in FIG. 2. The flowchart shown in FIG. 2 is designed to illustrate circuit operation and is not intended to describe the control procedure performed by the programming. The voltage $V_C$ to which the charging capacitor 10 is charged is constantly applied to the minus terminals of the first and second comparators 15 and 16, and the charging voltage $V_C$ is compared with the reference voltages $V_H$ ($V_L$) and $V_{HH}$.

Steps S1 and S2 in FIG. 2 are performed when the charging voltage $V_C$ decreases below the first reference voltage $V_H$, such as when the system has been discharged by being allowed to stand for a long time, a heavy load has been driven, or the like. When that happens, the output of the first comparator 15 rises to a high level (hereinafter referred to as "H"), the resulting H signal is inverted by the inverter 18 to produce a low level (hereinafter referred to as "L"), and the L signal is applied to the gate of the first switching element 11. The first switching element 11 is thereby opened, thus preventing the charging voltage from being applied to the electromotive unit 3. In other words, first switching element 11 and electromotive unit 3 are disabled.

Meanwhile, a third reference voltage $V_{HH}$, which is greater than the first reference voltage $V_H$, is applied to the plus terminal of the second comparator 16. The second comparator 16 outputs an H signal since the charging voltage $V_C$ is less than the first reference voltage $V_H$, and the H signal is applied to the gate of the second switching element 12 via the buffer 19. As a result, second switching element 12 is closed so that charging capacitor 10 is charged by the dynamo 1.

Steps S1 and S3 are performed when the charging capacitor 10 is subsequently charged and the charging voltage $V_C$ exceeds the first reference voltage $V_H$. When that happens, the charging voltage $V_C$ applied to the minus terminal of the first comparator 15 exceeds the first reference voltage $V_H$, so first comparator 15 outputs an L signal. The inverter 18 inverts the L signal, and the resulting H signal is applied to the gate of the first switching element 11. The first switching element 11 closes so that the charging voltage can be applied to the electromotive unit 3. In other words, the operation of first switching element 11 and electromotive unit 3 are enabled.

Meanwhile, the voltage $V_C$ is compared with the third reference voltage $V_{HH}$ by the second comparator 16, and second comparator 16 continues to output an H signal until the third reference voltage $V_{HH}$ is exceeded. Thus, switching element 12 remains closed and charging capacitor 10 continues to be charged until the third reference voltage $V_{HH}$ is exceeded.

After the charging voltage $V_C$ exceeds the first reference voltage $V_H$, reference voltage generating circuit 17 applies the second reference voltage $V_L$ to the plus terminal of the first comparator 15, wherein the second reference voltage $V_L$ is less than the first reference voltage $V_H$. Steps S4 and S5 are performed when the charging voltage $V_C$ decreases below the second reference voltage $V_L$. When that happens, first comparator 15 outputs an H signal, this signal is inverted by the inverter 18 to produce an L signal, and the L signal is applied to the gate of the first switching element 11. Consequently, the first switching element 11 is opened, and the first switching element 11 and electromotive unit 3 are again disabled. It should be readily apparent that this changing of the reference voltages provides a hysteresis effect to stabilize the switching operation.

It may be desirable to configure electromotive unit 3 such that the equipment on the side of the electromotive unit 3 is controlled before the supply of electric power to the electromotive unit 3 is stopped. In the case of an electrically powered shifter, for example, the supply of electric power may be stopped after the shifter has been moved to the easiest speed step. It may be desirable in such a case to monitor the charging voltage on the side of the electromotive unit 3 and to estimate the control procedures to be undertaken on the side of the power control circuit 4.

Steps S6 and S7 are performed when the charging voltage $V_C$ exceeds the third reference voltage $V_{HH}$. As noted previously, the third reference voltage $V_{HH}$ is greater than the first reference voltage $V_H$. Because in this case the charging voltage $V_C$ applied to the first comparator 15 exceeds the first reference voltage $V_H$, first comparator 15 outputs an L signal, this signal is inverted by the inverter 18 to an H signal, and the H signal is applied to the gate of the first switching element 11. The first switching element 11 closes, thus enabling the operation of the electromotive unit 3. Meanwhile, the charging voltage $V_C$ applied to the minus terminal in the second comparator 16 is greater than the third reference voltage $V_{HH}$, so second comparator 16 outputs an L signal. The second switching element 12 opens, thus stopping the charging of the charging capacitor 10.

In the foregoing embodiment, the supply of electric power to the electromotive unit 3 is stopped and the electromotive unit 3 is disabled until the charging voltage $V_C$ exceeds the first reference voltage $V_H$ (e.g., 6V) thus making it possible to prevent the electromotive unit 3 from operating in an unstable manner. Any instability affecting the closing and opening control of the first switching element 11 can be prevented by adopting a hysteresis arrangement described above in which a second reference voltage $V_L$ (e.g., 4.5V) below the first reference voltage $V_H$ is used as a threshold to control the supply of electric power to the electromotive unit 3 after the operation of the electromotive unit 3 has been enabled. Furthermore, stopping the charging process once the charging voltage $V_C$ exceeds the third reference voltage $V_{HH}$ makes it possible to prevent excessive electric power from being fed to the electromotive unit 3 and allows the electromotive unit 3 to operate in a stable manner. The charging capacitor 10 can be protected by selecting the desired setting for the third reference voltage.

While the above is a description of an embodiment of the present invention, further modifications may be employed without departing from the spirit and scope of the present invention. For example, the size, shape, location or orientation of the various components may be changed as desired. Components that are shown directly connected or contacting each other may have intermediate structures disposed between them. Although the above embodiment was described with reference to a case in which the first switching element 11 was provided separately from the electromotive unit 3, it is also possible to adopt an arrangement in which the first switching element is incorporated into the electromotive unit 3. In such a case, the signal line of the first comparator 15 may be connected to the electromotive unit 3 in addition to the power line. Although the above embodiment was described with reference to a case in which the power control circuit was an analog circuit, it is also possible to adopt an arrangement in which a microcomputer is used to perform the control procedures. Software may be substituted for hardware. Voltage may be indirectly sensed by measuring resistance or current according to Ohm's law. The functions of one element may be performed by two or more, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A power control circuit having an input for receiving power from a power source and an output for driving a bicycle electromotive unit comprising:
    a storage unit;
    a first switching element disposed between the storage unit and the output;
    a voltage sensor that senses a voltage associated with the storage unit; and
    a switch control circuit operatively coupled to the voltage sensor and to the first switching element to disable the communication of power to the output when the voltage associated with the storage unit is less than a first reference voltage and to enable the communication of power to the output when the voltage associated with the storage unit is greater than the first reference voltage.

2. The circuit according to claim 1 wherein the storage unit comprises a capacitance.

3. The circuit according to claim 1 wherein the first switching element comprises a transistor.

4. The circuit according to claim 1 wherein, after the switch control circuit enables the communication of power to the output, the switch control circuit maintains the communication of power to the output when the voltage associated with the storage unit falls below the first reference voltage and is above a second reference voltage.

5. The circuit according to claim 4 wherein the switch control circuit disables the communication of power to the output when the voltage associated with the storage unit falls below the second reference voltage.

6. The circuit according to claim 5 wherein the storage unit comprises a capacitance.

7. The circuit according to claim 6 wherein the first switching element comprises a transistor.

8. The circuit according to claim 1 further comprising a second switching element disposed between the input and the storage unit, wherein the switch control circuit is operatively coupled to the second switching element to enable the communication of power to the storage unit when the voltage associated with the storage unit is less than the first reference voltage and to disable the communication of power to the storage unit when the voltage associated with the storage unit is greater than a third reference voltage.

9. The circuit according to claim 8 wherein, after the switch control circuit enables the communication of power to the output, the switch control circuit maintains the communication of power to the output when the voltage associated with the storage unit falls below the first reference voltage and is above a second reference voltage.

10. The circuit according to claim 9 wherein the switch control circuit disables the communication of power to the output when the voltage associated with the storage unit falls below the second reference voltage.

11. The circuit according to claim 10 wherein the storage unit comprises a capacitance.

12. The circuit according to claim 11 wherein the first switching element comprises a first transistor, and wherein the second switching element comprises a second transistor.

13. A bicycle device comprising:
    a dynamo;
    an electromotive unit;
    a power control circuit comprising:
        a storage unit operatively coupled to the dynamo;
        a first switching element disposed between the storage unit and the electromotive unit;
        a voltage sensor that senses a voltage associated with the storage unit; and
        a switch control circuit operatively coupled to the voltage sensor and to the first switching element to disable the communication of power to the electromotive unit when the voltage associated with the storage unit is less than a first reference voltage and to enable the communication of power to the electromotive unit when the voltage associated with the storage unit is greater than the first reference voltage.

14. The circuit according to claim 13 wherein the storage unit comprises a capacitance.

15. The circuit according to claim 13 wherein the first switching element comprises a transistor.

16. The circuit according to claim 13 wherein, after the switch control circuit enables the communication of power to the electromotive unit, the switch control circuit maintains the communication of power to the electromotive unit when the voltage associated with the storage unit falls below the first reference voltage and is above a second reference voltage.

17. The circuit according to claim 16 wherein the switch control circuit disables the communication of power to the electromotive unit when the voltage associated with the storage unit falls below the second reference voltage.

18. The circuit according to claim 17 wherein the storage unit comprises a capacitance.

19. The circuit according to claim 18 wherein the first switching element comprises a transistor.

20. The circuit according to claim 13 further comprising a second switching element disposed between the dynamo and the storage unit, wherein the switch control circuit is operatively coupled to the second switching element to enable the communication of power to the storage unit when the voltage associated with the storage unit is less than the first reference voltage and to disable the communication of power to the storage unit when the voltage associated with the storage unit is greater than a third reference voltage.

21. The circuit according to claim 20 wherein, after the switch control circuit enables the communication of power to the electromotive unit, the switch control circuit maintains the communication of power to the electromotive unit when the voltage associated with the storage unit falls below the first reference voltage and is above a second reference voltage.

22. The circuit according to claim 21 wherein the switch control circuit disables the communication of power to the electromotive unit when the voltage associated with the storage unit falls below the second reference voltage.

23. The circuit according to claim 22 wherein the storage unit comprises a capacitance.

24. The circuit according to claim 23 wherein the first switching element comprises a first transistor, and wherein the second switching element comprises a second transistor.

* * * * *